United States Patent
Edwards et al.

(10) Patent No.: US 10,929,877 B2
(45) Date of Patent: Feb. 23, 2021

(54) MEDIA PLAYBACK PING

(71) Applicant: Verizon Patent and Licensing Inc., Basking Ridge, NJ (US)

(72) Inventors: Nathan James Edwards, Lehi, UT (US); David Frederick Brueck, Saratoga Springs, UT (US)

(73) Assignee: Verizon Digital Media Services Inc., Dulles, VA (US)

( * ) Notice: Subject to any disclaimer, the term of this patent is extended or adjusted under 35 U.S.C. 154(b) by 623 days.

(21) Appl. No.: 15/097,171

(22) Filed: Apr. 12, 2016

(65) Prior Publication Data

US 2017/0293933 A1    Oct. 12, 2017

(51) Int. Cl.
  *G06Q 30/02* (2012.01)
  *H04L 29/08* (2006.01)
  *H04L 12/26* (2006.01)

(52) U.S. Cl.
  CPC ......... *G06Q 30/0246* (2013.01); *H04L 43/10* (2013.01); *H04L 67/025* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 9,519,914 B2 * | 12/2016 | Splaine | ............... | G06Q 30/0204 |
| 2013/0091019 A1 * | 4/2013 | Mallon | ............... | G06Q 30/0251 |
| | | | | 705/14.68 |
| 2016/0007083 A1 * | 1/2016 | Gurha | ............... | H04N 21/44222 |
| | | | | 725/13 |
| 2016/0080804 A1 * | 3/2016 | Firth | .................. | H04N 21/2407 |
| | | | | 725/14 |

* cited by examiner

*Primary Examiner* — Chystina E Zelaskiewicz
(74) *Attorney, Agent, or Firm* — Ansari Katiraei LLP; Arman Katiraei; Sadiq Ansari

(57) ABSTRACT

Server side content impression progression tracking is performed using ping triggers and pings. A server generates ping triggers for content based on an impression list from a configuration provided by the content originator. The server sets different times at which the ping triggers are to fire during content playback. When media playback on a client reaches a time set for a ping trigger, the ping trigger causes the client to return a ping to the server to indicate that playback has reached the designated time. In this manner, the pings granularly track content viewership on different clients, wherein the granular tracking measures not only whether content was viewed or not, but also how much of the content was viewed. Subsequent content to a particular client can be customized based on preferences derived from pings tracked from the particular client.

17 Claims, 7 Drawing Sheets

MEDIA PLAYBACK PING

BACKGROUND ART

Traditional broadcast media could not provide advertisers detailed information about advertisement viewership simply because the transmission was one-way in most cases. This lack of information made it difficult for advertisers to accurately track the success of an advertising campaign, the return generated by the campaign, and, even more critically, how many viewers actually saw the advertisement and the particular demographic of those viewers that did not turn away during the advertisement presentation.

Traditional broadcast media also prevented advertisements from granularly customizing advertisements. Although advertisers could select a time slot, a geographic region, and content with which to present the advertisement, the advertisers would still have to present the same advertisement to the audience at the selected time slot, geographic region, and content.

With online media advertising, advertisers can obtain more granular information about the viewership of each presented advertisement and can customize or target the advertisement that is presented to each viewer based on preferences of the viewer. This is due to the online media delivery platform having a direct link to each individual viewer. From the direct link, individual viewing habits and preferences can be identified. This information can then be used to determine if an advertisement was viewed by a particular viewer, and as a result, how to better target advertisements to that particular viewer.

As the informational granularity increases so too does the advertisers' ability to better monetize and customize its advertisements. For instance, a binary indication as to whether or not an advertisement was viewed does not differentiate between whether none, some, or most of the advertisement was viewed. This granular information is not accurately available from the server send side, because not all content sent by a server to a client is necessarily played back on the client. The server will typically send chunks or segments of video ahead of the actual playback time of the video. If the video playback was changed or terminated, the amount of playback cannot accurately be determined from what the server has sent to the client. In some cases, an advertisement or other content is contained within a single file. Here, the server sends the whole file without any ability to ascertain how much of the advertisement or content embedded in the file is played back by the client.

Content distributors and advertisers have therefore resorted to client side tracking of online advertisement impressions. Client side tracking however can only be implemented with specialized client player applications that perform the impression tracking and reporting desired by a particular advertiser. Moreover, a different specialized client player would be needed for viewing on different supported platforms such as traditional personal computers, smartphones, and set-top boxes as some examples. Since different advertisers and content distributors have different requirements and the number of supported platforms continues to increase, the end user may have to install and juggle between several different applications to view content. This undermines the user experience and prevents the wide scale deployment of client side online advertisement impression tracking.

Accordingly, there is a need to improve the granularity of the information that the online media delivery platform collects and reports to one or more advertisers. There is a need to do so without impacting the user experience and in a manner that can be adopted by many advertisers and content distributors. There is also a need to customize the reporting in order to accommodate the reporting requirements of different advertisers that rely on the media delivery platform for advertisement distribution and to further accommodate different reporting frequencies when serving advertisements of different lengths.

BRIEF DESCRIPTION OF THE DRAWINGS

A preferred embodiment of methods and systems for content impression progression tracking with media playback pings will now be described, by way of example only, with reference to the accompanying drawings in which.

DETAILED DESCRIPTION

Figure 1:
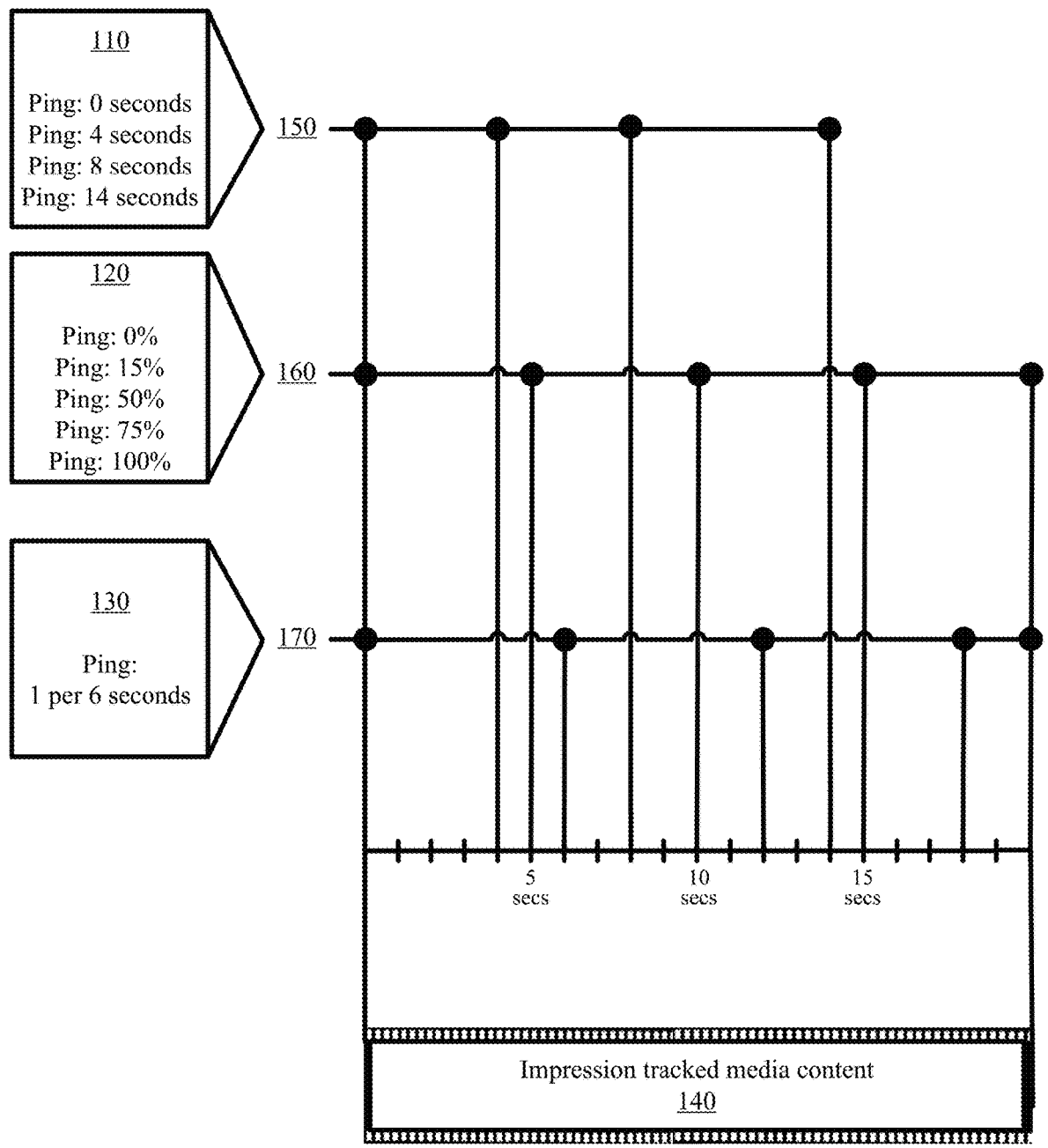
FIG. 1 illustrates different advertisement ping schedules for a particular advertisement and a resulting set of advertisement pings that fire from triggers a server defines for a client in accordance with some embodiments.

The embodiments disclosed herein provide server side advertisement or content impression progression tracking. The server side advertisement impression tracking is implemented with pings. Servers identify playback times for different advertisement or media content impressions and signal client players with ping triggers. The ping triggers provide the client players with the impression timing causing the client players to ping the server when the playback has reached the impression times.

The pings control client reporting frequency during advertisement or media playback. The pings granularly track viewership on different clients. In particular, the pings allow content or advertisement providers to not only track whether an advertisement or media content was viewed or not, but also how much of the advertisement or media content was viewed. The pings can therefore reveal whether and when a client skipped, minimized, hid, obscured, blocked, closed, cut short, or otherwise performed an action that stopped pings from being sent prior to end time of the advertisement or media content.

The pings change the definition of an impression. With the pings set forth herein, an impression can now quantify a viewing time or quantify a viewing percentage as opposed to the prior art limited definition of whether media content was viewed or not viewed. This change in tracking impressions allows content providers and advertisers to differentiate costs based on actual viewing time. This change in tracking impressions also allows content providers and advertisers to better customize or target their content to individual clients. Interest in a subject, product, service, brand, or presented content is no longer based on incomplete or completed viewership of the content, but rather how much of the content was viewed.

It should be noted that the pings are not restricted to granularly tracking advertisement impressions. The pings can be used to track impressions of any media content, wherein the media content can include video, audio, a set of images, text, applications, services, or any other content with a temporal duration. The pings can therefore encompass advertisement pings used for tracking impression progression through an advertisement or media content pings used for tracking impression progression through media content. The terms "ping", "advertisement ping", and "media ping" therefore refer to the same construct and can be used interchangeably herein.

In some embodiments, the ping is a signal or message periodically communicated from the client application to the server. The client application runs on any network enabled client device that presents advertising or other content served by the server. The pings do not require the introduction of customized libraries or code on the client players. Accordingly, the pings work with existing client players operating across different platforms. This can include client applications executing on computers, laptops, mobile devices, gaming devices, set-top boxes, and other such devices.

Content providers including advertisers can customize and alter ping impressions and information with a configuration. Different configurations can be specified for different media content. With the configurations, content providers can customize the impression granularity of each media content instance independently.

In some embodiments, the configuration specifies an impression list. The impression list sets the ping schedule. The ping schedule defines the impressions a content provider wants to track for a given piece of media content. FIG. 1 illustrates different ping schedules 110, 120, and 130 for particular media content 140 and a resulting set of pings that fire from triggers a server defines for a client in accordance with some embodiments.

The figure illustrates a first schedule 110 defining pings according to relative playback times, a second schedule 120 defining pings according to percentages, and a third schedule 130 defining pings according to a frequency or interval. It should be noted that other milestones and formats can be used to define and set the ping schedules.

The first schedule 110 results in pings 150 at start, 4 seconds, 8 seconds, and 14 seconds of the particular media content 140. The second schedule 120 results in pings 160 at start, 25%, 50%, 75%, and 100% of the particular media content 140, wherein the quartile percentages correspond to 5 seconds (i.e., 25%), 10 seconds (i.e., 50%), 15 seconds (i.e., 75%), and 20 seconds (i.e., 100%) of the particular media content 140 playback. The third schedule 130 results in pings 170 at every 6 seconds of the particular media content 140. The final ping sent in response to the third schedule 130 is sent at completion of the media content 140 playback, even through the media content 140 end time does not fall within the 6 second intervals.

In some embodiments, the configuration also specifies events or additional information that is reported with each ping. The information can include the client address, client session, an identifier identifying the content being pinged, and milestones or intervals that have been reached during playback as some examples.

In some embodiments, the ping configuration is separate from the media content. In some such embodiments, the configuration may be defined directly with the server hosting or distributing the media content. The media content can therefore exist independent of the configuration. In some other embodiments, the ping configuration is embedded as part of the media content. The configuration can be entered as metadata in the media content.

In any case, before or contemporaneous with the distribution of media content, the server obtains the configuration associated with the media content, creates at least one ping trigger according to the configuration, and passes the ping trigger to the client before or as part of sending the media content. Once the client reaches the playback position of the ping trigger, the client sends a ping to the server. The server can generate the next ping trigger to send to the client until playback is complete or the server stops receiving pings from the client.

Figure 2:
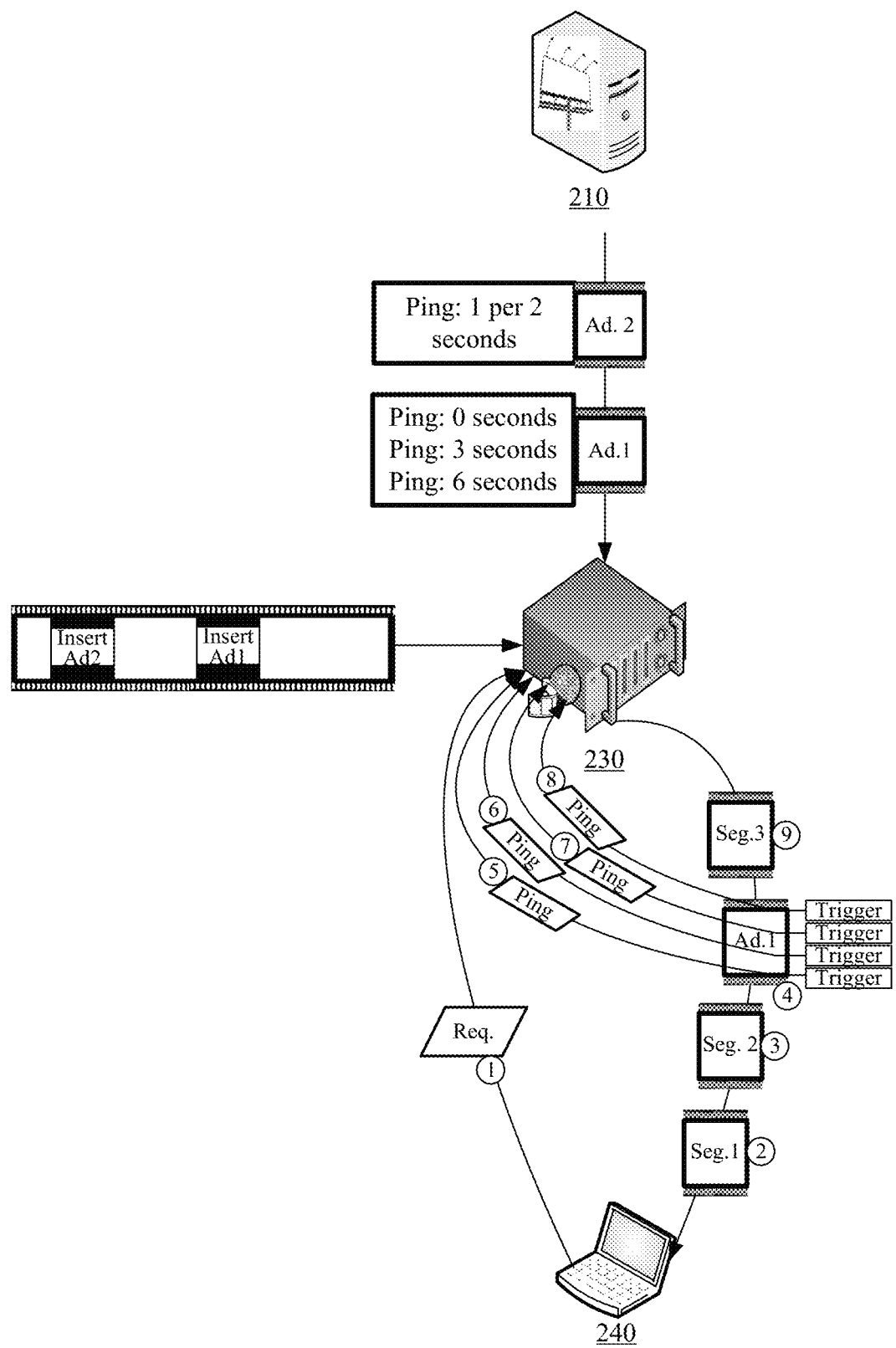
FIG. 2 conceptually illustrates the environment of some embodiments in which advertisement pings are implemented.

FIG. 2 conceptually illustrates the environment of some embodiments in which pings are implemented. The figure illustrates an advertiser 210, a media distribution server 220, and a client 230. The advertiser 210, media distribution server 220, and client 230 are communicably coupled over a digital network, such as the Internet.

The advertiser 210 creates different advertising content for insertion and distribution by the server 220. In particular, the server 220 inserts the different advertisements as part of other content it serves to the client 230. The advertiser 210 also specifies ping configurations for the advertising content.

The client 230 requests video content from the server 220. The server 220 passes chunks or segments of the video content to the client 230 in response to the requests. At some point in the distribution, the server 220 identifies an advertising break in the video content. The server obtains demographic information about the client 230 before selecting an advertisement from the advertiser 210. The server 220 also retrieves the configuration that was specified for the selected advertisement. The server 220 creates the ping triggers according to the configuration and sends a first ping trigger before or with the selected advertisement to the client 230.

In response to a ping, the server 220 updates the impression progression, sends the next ping trigger to the client 230, and awaits the next client 230 ping before repeating. The first ping notifies the server 220 that the client 230 has commenced advertisement playback. Subsequent pings notify the server 220 of progression during the advertisement playback. The server 220 tracks the total progression based on the number of received pings. The pings stop when the playback by the client is complete or interrupted.

The server 220 also passes the tracked impression progression to the advertiser 210. The server 230 may update the advertiser 210 with each ping the server 220 receives from the client 230. The server 220 may alternatively update the advertiser 210 after impression tracking of each advertisement is complete or after an advertising campaign specifying a total number of impressions for an advertisement is complete.

Figure 3:
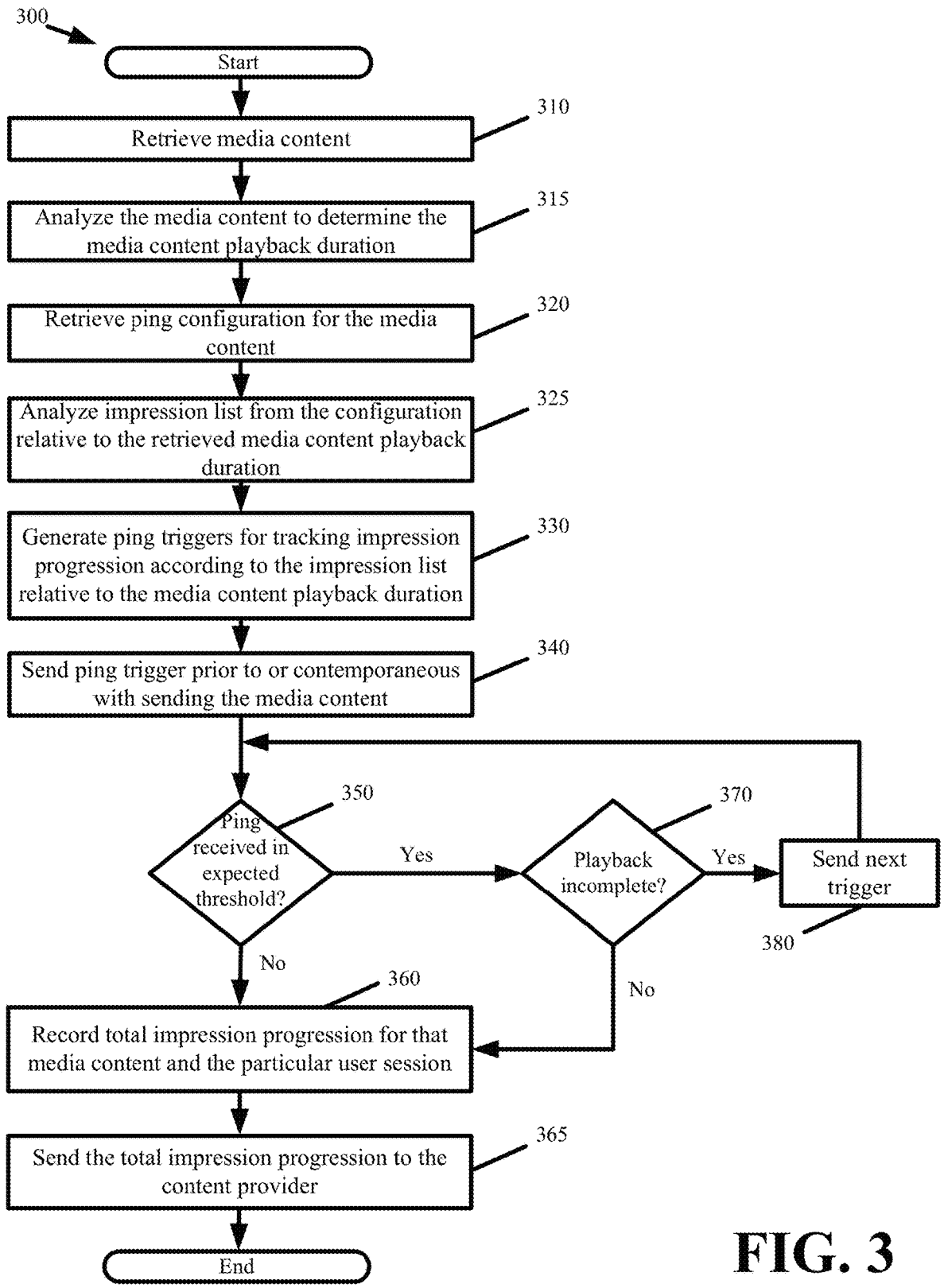
FIG. 3 presents a process for generating ping triggers in accordance with some embodiments.

FIG. 3 presents a process 300 for generating ping triggers in accordance with some embodiments. The process 300 is performed by the media distribution server. The process 300 commences prior to the distribution of media content for which impression progression tracking is desired. If the media content involves an advertisement, the process 300 may commence upon detecting an advertisement break in the distribution of other media content. The process 300 can execute multiple times when multiple advertisements are inserted at different parts of the content.

The process retrieves (at 310) the media content. The process analyzes (at 315) the media content to determine the media content playback duration.

The process also retrieves (at 320) a ping configuration for the media content. The process analyzes (at 325) the impression list from the configuration relative to the retrieved media content playback duration.

The process generates (at 330) the ping triggers for tracking impression progression according to the impression list relative to the media content playback duration. In some embodiments, generating the ping triggers involves identifying the absolute times for when the ping triggers should fire during media content playback, wherein the firing of the ping trigger involves the client sending a ping back to the server. In some embodiments, the server divides the total media content playback duration by the schedule impression list ping frequency, percentages, or milestones to set absolute times for the ping triggers. For example, for 30 second media content and an impression list with 25%, 50%, 75%, and 100% playback impression progressions, the process determines a first ping trigger for playback commencement, a second ping trigger for playback reaching 7.5 seconds (30*0.25), a third ping trigger for playback reaching 15 seconds (30*0.5), a fourth ping trigger for playback reaching 22.5 seconds (30*0.75), and a fifth ping trigger for playback completion at 30 seconds (i.e., 100% progression).

The process sends (at 340) a ping trigger prior to or contemporaneous with sending the media content. Typically, the first ping trigger sets a threshold for firing a ping when the client commences media content playback. The first ping trigger can cause the client to send a ping at 0 seconds of playback. In some embodiments, the first ping trigger is passed as a HyperText Transfer Protocol (HTTP) message. In some embodiments, one or more ping triggers are embedded in the HTTP message payload.

The process determines (at 350) if a ping is received from the client within an expected threshold. For instance, the server determines ongoing playback upon receiving a ping within 10 seconds of sending a ping trigger that is configured to fire 5 seconds into media content playback.

If playback is terminated as a result of not receiving the ping in response to the sent ping trigger, the process records (at 360) the total impression progression for that media content in the particular session. In some embodiments, the process also sends (at 365) the total impression progression to the content provider originating the media content.

Otherwise, playback is ongoing. In such cases, the process determines (at 370) if playback is incomplete. The playback incompletion determination at 370 is based on whether any generated ping triggers have yet to be sent to the client.

If playback is complete, then the process will have received all pings defined for impression tracking of a particular media content. The process reverts to steps 360 and 365 to record and send the total impression progression for the media content to a content provider.

If playback is incomplete, the process sends (at 380) the next ping trigger. The process then reverts to step 350.

Figure 4:
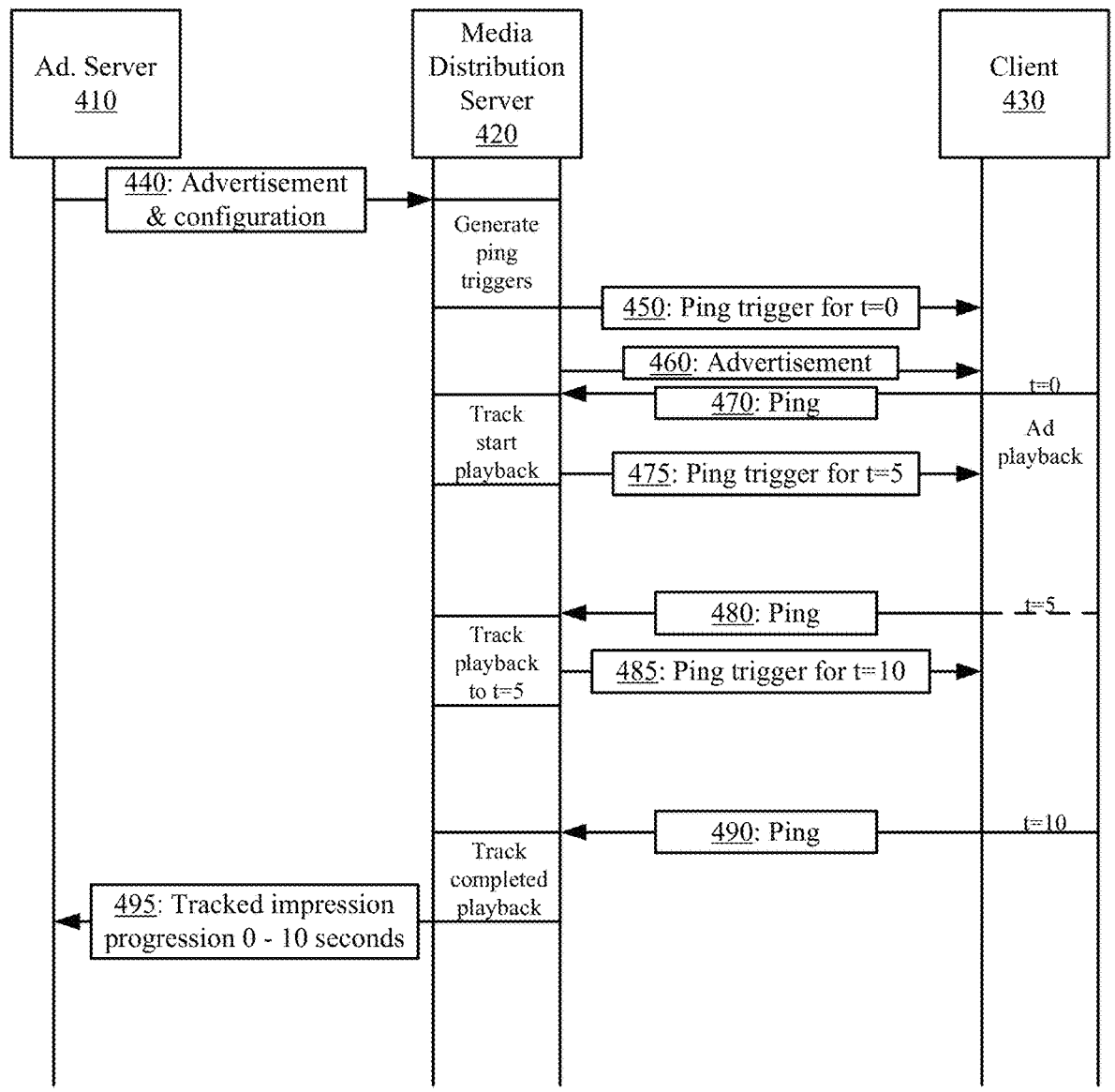
FIG. 4 illustrates a message exchange for tracking impression progression in accordance with some embodiments.

FIG. 4 illustrates a message exchange for tracking impression progression in accordance with some embodiments. The figure illustrates messages exchanged between an advertiser 410, the media distribution server 420 of some embodiments, and a client 430 over a digital network in order to track impression progression at five second intervals.

The exchange commences with the server 420 retrieving (at 440) an advertisement from the advertiser 410. The server 420 can also obtain (at 440) a schedule with an advertiser 410 specified impression list from the advertiser 410.

The server 420 generates the ping triggers for the advertisement according to the schedule and sends (at 450) a first ping trigger that instructs the client 430 to send a ping upon commencement of advertisement playback. Contemporaneously, the server 420 sends (at 460) the advertising content to the client 430.

In response to the first ping trigger sent at 450 and commencing playback of the advertisement, the client 430 sends (at 470) the first ping to the server 420. In response to the first ping, the server 420 sends (at 475) the client 430 the second ping trigger with the time for the second advertisement impression set according to the client 430 current playback time. In this figure, the second ping trigger instructs the client 430 to send an advertisement ping when playback has reached the five second mark.

The client 430 sends (at 480) the second ping to the server 420 upon reaching the five second mark in the advertisement playback. In response, the server 420 sends (at 485) the next ping trigger for signaling when playback reaches the ten second mark.

Since the server 420 knows that each ping represents five seconds of playback and the total duration of the advertisement, the server 420 tracks the impression progression based on the total number of pings received from the client 430. Each received ping adds five seconds to the impression. In FIG. 4, the server 420 tracks a complete impression upon receiving three pings from the client 430. In differing from the prior art, the server 430 also tracks a partial impression if less than three pings are received. More specifically, the server 420, by way of tracking the impression progression with the pings, accurately quantifies how much of the advertisement (e.g., 5 seconds, 10 seconds, or 15 seconds) was played back by the client 430. In some embodiments, the tracked impression for that particular advertisement instance along with demographic or other identifying information about the client 430 or user are communicated (at 495) from the server 420 to the advertiser 410.

Figure 5:
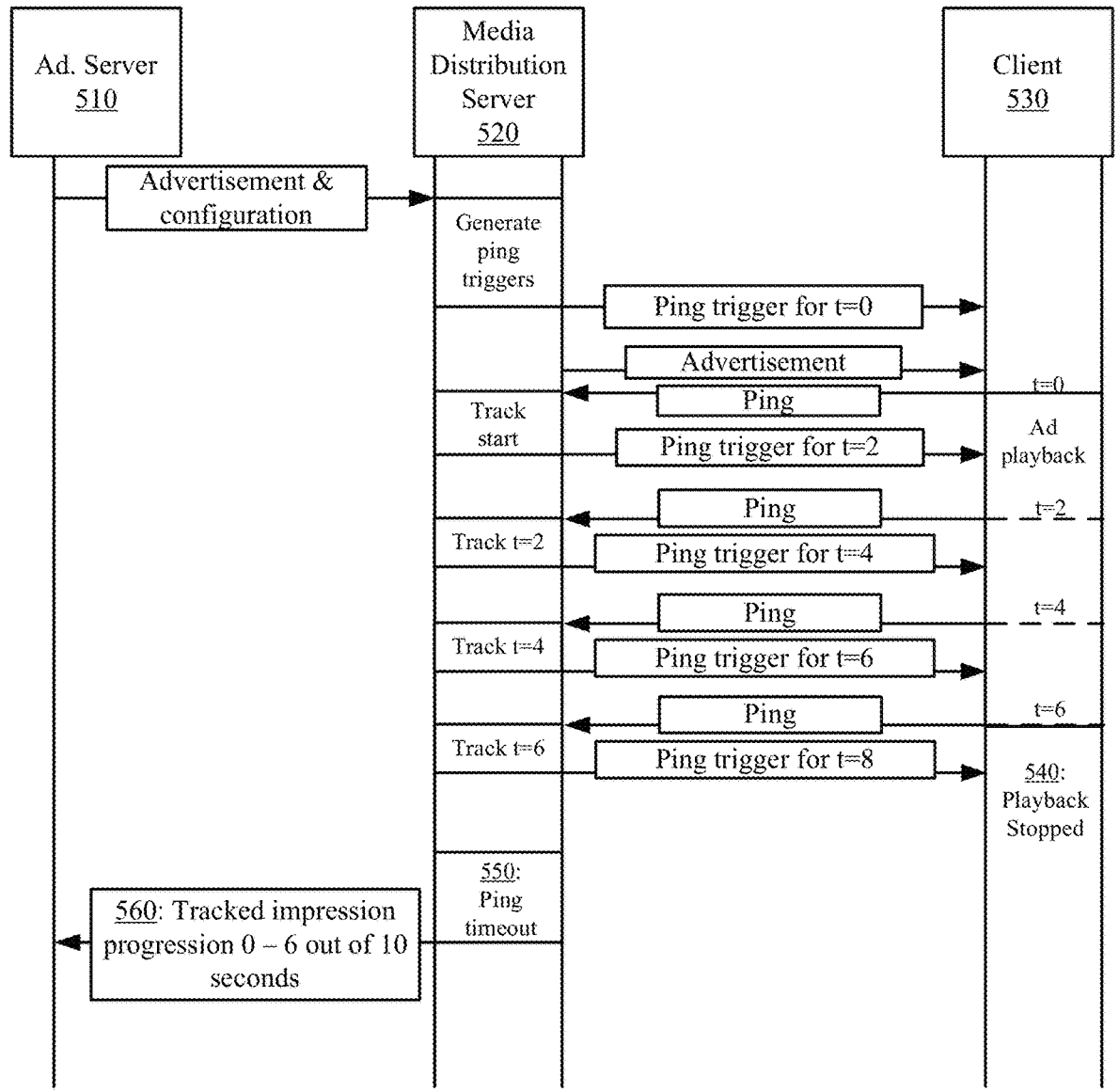
FIG. 5 also illustrates tracking partial advertisement impression progression in accordance with some embodiments.

In case the advertiser 410 wants greater impression granularity, the advertiser 410 modifies the ping frequency within the configuration for the advertisement. FIG. 5 illustrates sending pings at two second intervals instead of the five second intervals of FIG. 4. FIG. 4 and FIG. 5 demonstrate the different and configurable granular levels of playback progression tracking made possible by the pings.

FIG. 5 also illustrates tracking partial impression progression in accordance with some embodiments. Specifically, the client FIG. 5 stops (at 540) playback after the 6 second mark before the full advertisement is presented. A ping timeout set by the server 520 expires (at 550). From the ping timeout, the server 520 identifies that the client 530 did not send a ping within an expected time, and therefore playback on the client 530 device was prematurely cut short. The server 520 then reports (at 560) the partially tracked progression to the advertiser 510.

FIGS. 4 and 5 illustrate staggering the ping trigger sending in response to pings received from the client. In some embodiments, the server sends all the ping triggers for particular media content in one message to the client prior to or contemporaneous with sending the particular media content to the client.

In some embodiments, the server is configured with a ping application programming interface (API). The ping API controls the ping trigger generation. The ping API also tracks the impression progression resulting from pings sent in response to the ping triggers.

The client may issue an initial call to the ping API in response to the client invoking a link to view media content that is distributed by the server. The initial call provides the ping API with the current player time of the client. The ping API can set the ping trigger absolute times based on this current player time. For instance, a current player time of 8.018 can be the based to set absolute times for 5 second ping triggers at 13.018, 18.018, etc.

In some embodiments, a ping trigger is an HTTP message. In some embodiments, the ping trigger message body contains a parameter "{next_time: value}" with the value specifying the next time that the client should send a ping based on the current player time.

In some embodiments, a ping is a call the client player makes to the ping API. An exemplary ping API call or ping made by a client may specify:

http://<domain>/session/ping/<session identifier>.json?v=#&ev=start&pt=#

In above call, the <domain> is replaced with the domain name for reaching the server. The <session identifier> identifies the session created between the server and client. The "v=#" parameter provides the current API version. The "pt=#" parameter provides the ping API with the current player time. This parameter allows the server to identify the ping trigger the call is sent in response to. The "ev=" parameter specifies the event that trigger the call if applicable. This parameter can be used to signal the start of advertisement playback by the client.

As noted above, the media distribution server provides the tracked impression progression for particular media content to the content provider originating that particular media content. In some embodiments, the content provider performs its own campaign tracking in which case the media distribution server sends the pings to the content provider as the pings are received. In some embodiments, the content provider defers the campaign tracking to the media distribution server. As part of campaign tracking, the advertiser may request a certain number of impressions for particular media content. The media distribution server tracks impression progressions tallied from all clients that receive the particular media content from the server until the certain number of impressions is met. The media distribution server can then notify the content provider of the completed campaign as well as bill the content provider for payment.

In some embodiments, the media distribution server tallies metrics for different media content. For instance, from the pings, the server can determine the number of times particular media content was viewed up to at least 25%, 50%, 75%, and 100% of the particular media content's total duration. The server can further qualify the metrics based on client demographics and other differentiators. Some such metrics include the device type on which the client is implemented or age, income level, and sex of the users viewing the particular media content with the client. The metrics can then be passed to the advertiser.

The pings or metrics derived therefrom can also be used to customize the media content that the server passes to different clients. The media content can be classified according to different types or type parameters. Over time, the server can develop a database for media content that a particular client prefers based on the pings the particular client sends in response to media content of different types. The server can dynamically select media content that are similarly classified to media content preferred by the client in subsequently serving media content to the particular client. The server can also avoid media content that the client application has skipped, minimized, hid, obscured, blocked, closed, cut short, or otherwise did not view as indicated from pings of media content that failed to track impressions up to a certain threshold (e.g., viewing of at least 50% of the media content duration).

Figure 6:
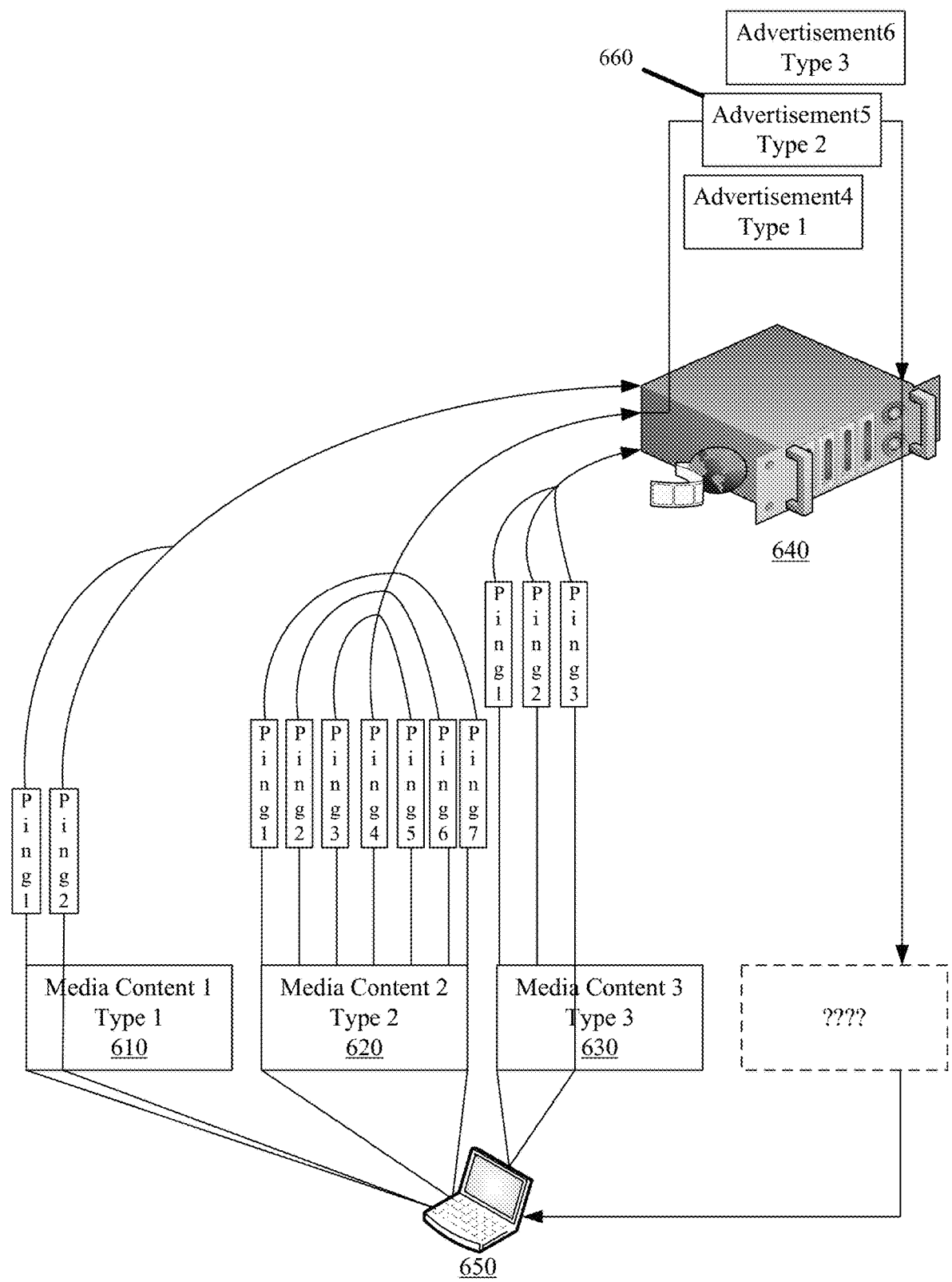
FIG. 6 conceptually illustrates customizing advertisements that are issued to a client based on prior advertisement pings from the client.

FIG. 6 conceptually illustrates customizing media content that are issued to a client based on prior pings from the client. The figure illustrates three prior media content 610, 620, and 630 that the media distribution server 640 of some embodiments serves to a particular client 650.

Each of the three prior media content 610, 620, and 630 is of a different classification type. The different classification types can be delineated in any desired fashion. For example, the first classification type can include media content for adults over 30 years of age, the second classification can include media content for adults between 18 and 29 years of age, and the third classification can include media content for children under 18 years of age.

As shown, the server 640 tracks the impression progression for each of the three media content 610, 620, and 630 based on prior pings the client 650 sent to the server 640. The pings reveal that the client 650 watched all of the second type media content 620 and watched less than half of first type media content 610 and the third type media content 630. In particular, the server 640 stops receiving pings for the first and third media content 610 and 630 before the midpoint of each of the first and third media content 610 and 630 is reached. As noted above, this can be due to the client 650 skipping, minimizing, hiding, obscuring, blocking, closing, cutting short, or otherwise performing an action that stopped the client 650 from sending pings to the server 640.

The figure continues with the server 640 selecting a fourth media content 660 to send to the client 650. Based on the pings received for the first, second, and third media content 610, 620, and 630, the server 640 tracks client 650 preference for the second media content 620 classification type. The server 640 therefore selects the fourth media content 660 to be of the second classification type and sends the media content 660 to the client 650.

In some embodiments, client preference tracking is based on many media content sent to the client supplemented with other parameters including time of day, client device type, client network connectivity, etc. In some embodiments, the media content customization and targeting is based on the preferences of a set of clients that share one or more characteristics. The server can also leverage pings received from a first set clients in customizing and targeting media content for a similar second set of clients. For example, preferences tracked for a set of clients operated by users between the ages of 18 and 29 can be used to customize and target media content to a new client of a similar demographic.

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 7:
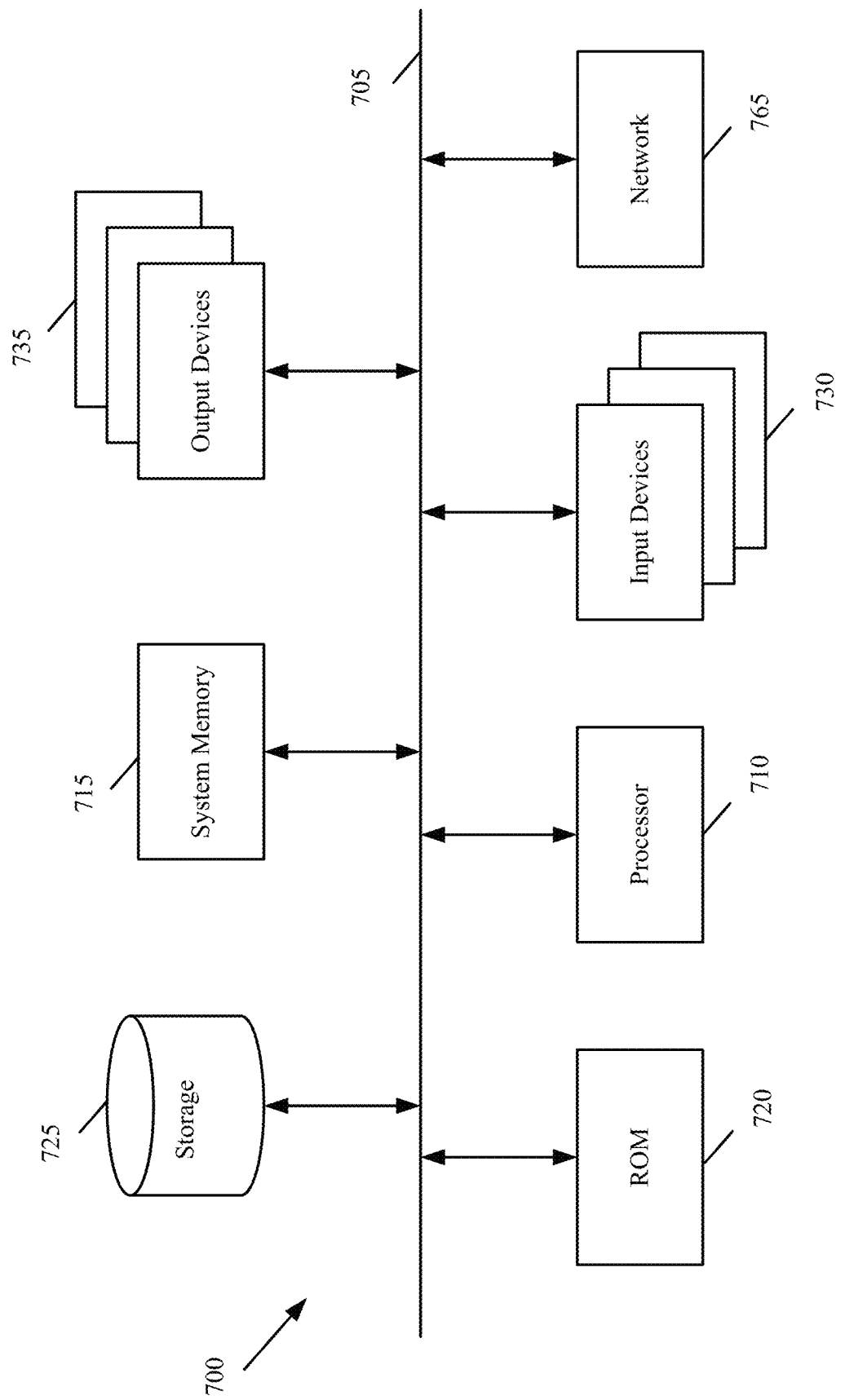
FIG. 7 illustrates a computer system or server with which some embodiments are implemented.

FIG. 7 illustrates a computer system or server with which some embodiments are implemented. Such a computer system includes various types of computer-readable mediums and interfaces for various other types of computer-readable mediums that implement the various methods and machines described above (e.g., media distribution server). Computer system 700 includes a bus 705, a processor 710, a system memory 715, a read-only memory 720, a permanent storage device 725, input devices 730, and output devices 735.

The bus 705 collectively represents all system, peripheral, and chipset buses that communicatively connect the numerous internal devices of the computer system 700. For instance, the bus 705 communicatively connects the processor 710 with the read-only memory 720, the system memory 715, and the permanent storage device 725. From these various memory units, the processor 710 retrieves instructions to execute and data to process in order to execute the processes of the invention. The processor 710 is a processing device such as a central processing unit, integrated circuit, graphical processing unit, etc.

The read-only-memory (ROM) 720 stores static data and instructions that are needed by the processor 710 and other modules of the computer system. The permanent storage device 725, on the other hand, is a read-and-write memory device. This device is a non-volatile memory unit that stores instructions and data even when the computer system 700 is off. Some embodiments use a mass-storage device (such as a magnetic, solid-state, or optical disk) as the permanent storage device 725.

Other embodiments use a removable storage device (such as a flash drive) as the permanent storage device Like the permanent storage device 725, the system memory 715 is a read-and-write memory device. However, unlike storage device 725, the system memory is a volatile read-and-write memory, such as random access memory (RAM). The system memory stores some of the instructions and data that the processor needs at runtime. In some embodiments, the processes are stored in the system memory 715, the permanent storage device 725, and/or the read-only memory 720.

The bus 705 also connects to the input and output devices 730 and 735. The input devices enable the user to communicate information and select commands to the computer system. The input devices 730 include alphanumeric keypads (including physical keyboards and touchscreen keyboards), pointing devices. The input devices 730 also include audio input devices (e.g., microphones, MIDI musical instruments, etc.). The output devices 735 display images generated by the computer system. The output devices include printers and display devices, such as cathode ray tubes (CRT) or liquid crystal displays (LCD).

Finally, as shown in FIG. 7, bus 705 also couples computer 700 to a network 765 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 700 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method for server-side tracking of media playback progression, the method comprising:

obtaining, at a media distribution server, first media content and a first ping schedule from a plurality of ping schedules that are defined for a plurality of different media content, wherein the first ping schedule is defined for the first media content by a particular content provider of the first media content, wherein the particular content provider is different than a client device playing back the first media content, wherein the first ping schedule comprises at least (i) a first condition that causes the media distribution server to send a first ping trigger to the client device, wherein the first ping trigger has an instruction for the client device to issue a ping upon reaching a first point of playback in the first media content and (ii) a second condition that causes the media distribution server to send a second ping trigger to the client device, wherein the second ping trigger has an instruction for the client device to issue a ping upon reaching a different second point of playback in the first media content, and wherein the first point of playback and the second point of playback are selected by the particular content provider and are locations in the first media content at which the client device reports playback status of the first media content;

sending, based on ping triggers of the first ping schedule, the first ping trigger over a digital network from the media distribution server to the client device contemporaneous with sending a first part of the first media content to the client device, wherein the instruction of the first ping trigger controls the client device in issuing a first ping upon playback of the first media content on the client device reaching the first point of playback defined in the first ping schedule;

receiving, at the media distribution server, the first ping from the client device in response to execution of the instruction of the first ping trigger by the client device upon the playback of the first media content reaching the first point of playback on the client device;

sending the second ping trigger from the media distribution server to the client device in response to receiving the first ping from the client device and the second ping trigger being defined after the first ping trigger in the first ping schedule, wherein the instruction of the second ping trigger controls the client device in issuing a second ping upon the playback of the first media content on the client device reaching the different second point of playback defined in the first ping schedule;

receiving, at the media distribution server, the second ping from the client device in response to execution of the instruction of the second ping trigger by the client device upon the playback of the first media content reaching the second point of playback on the client device; and customizing selection of different second media content intended for playback on the client device in response to receiving the first ping and the second ping.

2. The method of claim 1 further comprising sending the first and second pings from the media distribution server to the particular content provider.

3. The method of claim 1 further comprising notifying the particular content provider of an amount of the first media content playback by the client device as determined from the first ping and the second ping.

4. The method of claim 1 further comprising sending a third ping trigger to the client device, wherein an instruction of the third ping trigger controls the client device in issuing a third ping upon the playback of the first media content on the client device reaching a third point of playback defined in the ping schedule.

5. The method of claim 4 further comprising identifying a timeout expiring before receipt of the third ping from the client device, wherein the timeout is defined to be a particular amount of time after said sending of the third ping trigger.

6. The method of claim 5 further comprising tracking partial playback of the first media content to the second point of playback as a result of identifying the timeout expiring.

7. The method of claim 4 further comprising receiving the third ping from the client device in response to execution of the instruction of the third ping trigger by the client device upon the playback of the first media content reaching the third point of playback on the client device.

8. The method of claim 7 further comprising tracking completed playback of the first media content in response to determining that the third point of playback corresponds to an end time of the first media content.

9. The method of claim 1 further comprising determining a total duration of the first media content, and wherein the first point of playback and the second point of playback correspond to a different playback percentage.

10. The method of claim 9 further comprising setting a different absolute time for each of the first and second ping triggers by mapping the playback percentage of the first point of playback to a first absolute time within the total duration of the first media content, and by mapping the playback percentage of the second point of playback to a second absolute time within the total duration of the media content.

11. The method of claim 1 further comprising tracking partial playback of the first media content on the client device based on receiving pings for less than all ping triggers defined in the first ping schedule.

12. The method of claim 11 further comprising computing an amount of playback from a last ping or a set of pings received from the client device, wherein the last ping is associated with a particular playback time that is not an end time, and wherein each ping of the set of pings adds an incremental amount of playback to a total tally.

13. The method of claim 11 further comprising tracking complete playback of the first media content on the client device based on receiving a ping in response to each ping trigger defined in said schedule, wherein a last ping trigger is set to fire at an end time of the first media content.

14. The method of claim 1, wherein customizing selection of the second media content comprises selecting the second media content to be of a first type matching a type of the first media content based on the second ping identifying a threshold amount of playback of the first media content, and selecting the second media content to be of a second type different from the type of the first media content based on the second ping identifying less than the threshold amount of playback of the first media content.

15. The method of claim 14, wherein the second media content of the first type is directed to one of a similar demographic or product as the first media content, and wherein the second media content of the second type is directed to one of a different demographic or product than the first media content.

16. A non-transitory computer-readable medium, storing a set of processor-executable instructions, which, when executed by one or more processors, cause the one or more processors to:
obtain first media content and a first ping schedule from a plurality of ping schedules that are defined for a plurality of different media content, wherein the first ping schedule is defined for the first media content by a particular content provider of the first media content, wherein the particular content provider is different than a client device playing back the first media content, wherein the first ping schedule comprises at least (i) a first condition that causes the media distribution server to send a first ping trigger to the client device, wherein the first ping trigger has an instruction for the client device to issue a ping upon reaching a first point of playback in the first media content and (ii) a second condition that causes the media distribution server to send a second ping trigger to the client device, wherein the second ping trigger has an instruction for the client device to issue a ping upon reaching a different second point of playback in the first media content, and wherein the first point of playback and the second point of playback are selected by the particular content provider and are locations in the first media content at which the client device reports playback status of the first media content;
send, based on ping triggers of the first ping schedule, the first ping trigger over a digital network to the client device contemporaneous with sending a first part of the first media content to the client device, wherein the instruction of the first ping trigger controls the client device in issuing a first ping upon playback of the first media content on the client device reaching the first point of playback defined in the first ping schedule;
receive the first ping from the client device in response to execution of the instruction of the first ping trigger by the client device upon the playback of the first media content reaching the first point of playback on the client device;
send the second ping trigger to the client device in response to receiving the first ping from the client device and the second ping trigger being defined after the first ping trigger in the first ping schedule, wherein the instruction of the second ping trigger controls the client device in issuing a second ping upon the playback of the first media content on the client device reaching the different second point of playback defined in the first ping schedule;
receive the second ping from the client device in response to execution of the instruction of the second ping trigger by the client device upon the playback of the first media content reaching the second point of playback on the client device; and
customize selection of different media content intended for playback on the client device in response to receiving the first ping and the second ping.

17. A media distribution server comprising:
a non-transitory computer-readable medium storing a set of processor-executable instructions; and
one or more processors configured to execute the set of processor-executable instructions, wherein executing the set of processor-executable instructions causes the one or more processors to:

obtain first media content and a first ping schedule from a plurality of ping schedules that are defined for a plurality of different media content, wherein the first ping schedule is defined for the first media content by a particular content provider of the first media content, wherein the particular content provider is different than a client device playing back the first media content, wherein the first ping schedule comprises at least (i) a first condition that causes the media distribution server to send a ping trigger to the client device, wherein the first ping trigger has an instruction for the client device to issue a ping upon reaching a first point of playback in the first media content and (ii) a second condition that causes the media distribution server to send a second ping trigger to the client device, wherein the second ping trigger has an instruction for the client device to issue a ping upon reaching a different second point of playback in the first media content, and wherein the first point of playback and the second point of playback are selected by the particular content provider and are locations in the first media content at which the client device reports playback status of the first media content;

send, based on ping triggers of the first ping schedule, the first ping trigger over a digital network to the client device contemporaneous with sending a first part of the first media content to the client device, wherein the instruction of the first ping trigger controls the client device in issuing a first ping upon playback of the first media content on the client device reaching the first point of playback defined in the first ping schedule;

receive the first ping from the client device in response to execution of the instruction of the first ping trigger by the client device upon the playback of the first media content reaching the first point of playback on the client device;

send the second ping trigger to the client device in response to receiving the first ping from the client device and the second ping trigger being defined after the first ping trigger in the first ping schedule, wherein the instruction of the second ping trigger controls the client device in issuing a second ping upon the playback of the first media content on the client device reaching the different second point of playback defined in the first ping schedule;

receive the second ping from the client device in response to execution of the instruction of the second ping trigger by the client device upon the playback of the first media content reaching the second point of playback on the client device; and customize selection of different media content intended for playback on the client device in response to receiving the first ping and the second ping.

* * * * *